United States Patent Office 2,743,267
Patented Apr. 24, 1956

2,743,267
ACID MONO-AZO DYE

Johannes Heyna, Frankfurt am Main-Unterliederbach, and Wilhelm Schumacher, Frankfurt am Main, Germany, assignors to Farbwerke Hoechst Aktiengesellschaft vormals Meister Lucius und Bruning, Frankfurt (Main)-Hoechst, Germany, a German company No Drawing. Application June 20, 1951,
Serial No. 232,656

Claims priority, application Germany July 3, 1950

1 Claim. (Cl. 260—200)

The present invention relates to a process for producing fast dyeings and to the manufacture of dyestuffs for use therein. It is based on the observation that dyeings or prints of very good fastness properties can be produced on fibrous materials by applying to the material an acid azo-dyestuff containing the grouping of the formula

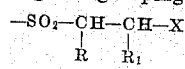

in which R represents hydrogen, alkyl or halogen, $R_1$ represents hydrogen or alkyl and X means halogen and, if desired, subjecting the material thus treated to the action of an agent of alkaline reaction. The above grouping may be present in the diazo component as well as in the coupling component or also in both components.

The treatment with an agent of alkaline reaction may be conducted in the presence of a compound containing a reactive hydrogen atom. Compounds of this kind are, for example, monohydric or polyhydric alcohols, amines, mercaptans, acid amides, ketones, sulfones, containing activated methylene groups or the like.

The invention also relates to a process for the manufacture of azo-dyestuffs suitable for the above dyeing or printing process which comprises introducing into the molecule of an acid azo-dyestuff or a primary product thereof according to a known method the grouping of the formula

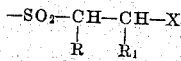

in which R represents hydrogen, alkyl or halogen, $R_1$ represents hydrogen or alkyl and X means halogen.

The products may be prepared, for instance, by converting an acid azo-dyestuff or a primary product into the sulfinic acid or an alkali salt of such acid, and then reacting the product with beta-chlorethyl alcohol or ethylene oxide or a homologue thereof. In the beta-hydroxyethyl-sulfones thus obtained, the hydroxyl-group is replaced by chlorine, for instance, by a treatment with thionyl chloride or concentrated hydrochloric acid. Azodyestuffs are thus obtained which contain the grouping

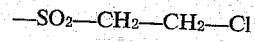

(cp. French Patent 901,306, lines 48 et seq.). The iodine compounds may be prepared according to the statements in the Journal of Organic Chemistry, March-volume 1950, page 414.

The process of the invention may be used to fix watersoluble azo-dyestuffs in an insoluble form on the fiber. Dyestuff compounds containing the grouping

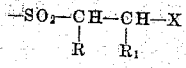

in which R, $R_1$ and X have the meanings given above, are soluble in water. They are absorbed by the fiber on which they are more or less firmly fixed depending on the constitution of the fundamental dyestuff molecule. When applying the water-soluble dyestuff compounds on the fiber, the acid residue is split off with formation of a vinyl group, if desired, by a treatment with agents of alkaline reaction. The insoluble dyestuff formed in this way is firmly fixed on the fiber and the vinyl group may possibly enter into reaction with reactive groups of the fibrous material.

The present process can be used to produce dyeings and prints on fibrous materials of any kind, for instance, materials composed of natural or artificial textile fibers, such as wool, silk, artificial protein fibers, superpolyamide fibers, cellulose fibers such as cotton, hemp, linen, regenerated or acetylated cellulose or mixtures of such fibers. The process may be applied to loose fibers, yarns or fabrics. Leather, foils and other materials having a fibrous structure, such as cardboard, paper, artificial leather etc. may also be treated by the present invention.

The dyeings are produced in the usual manner, using, for instance, 1–3 per cent. of the azo-dyestuff, calculated upon the fibrous material. By means of the usual printing methods local dyeings may be produced. If the dyestuff has no affinity for the fiber used, it is of advantage to impregnate the material with a solution of the dyestuff and squeeze and/or dry it, if necessary, or to spread the compound on the material and enter it into a solution of alkaline reaction which may also contain, for example, barium chloride, if desired. Since the acid radical is split off immediately, there is little likelihood of the compound being removed. It is also possible to subject the dried material to an alkaline after-treatment in an organic solvent or in the gas phase. Owing to the very reactive vinylsulfone group, formed on the fiber, the dyestuffs may enter into reaction with the reactive groups of the fibrous material. They may also be further condensed by reaction with compounds which are capable of reacting with the vinylsulfone groups thus formed.

By the present process it is possible to produce in a simple manner on fibrous materials dyeings and prints which are distinguished by very good fastness properties.

The following examples illustrate the invention, the parts being by weight unless otherwise stated, and the relationship of parts by weight to parts by volume being the same as that of the kilogram to the liter:

(1) Wool is dyed with 2 per cent. of the dyestuff of the formula:

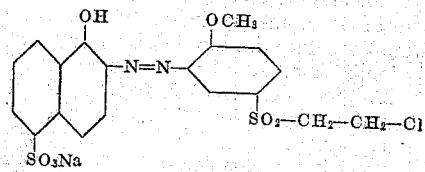

from a bath containing sulfuric acid or acetic acid. After rinsing, the dyeing is after-treated with a soap solution of 1 per cent. strength, rinsed thoroughly and dried. A vivid red dyeing of good fastness to fulling in an alkaline and in an acid solution, good to very good fastness to perspiration and sea-water and very good fastness to washing is obtained.

The dyestuff may be prepared as follows:

10 parts of 1-amino-2-methoxybenzene-5-(beta-chlorethylsulfone) melting at 90–91° C., are diazotized in the usual manner and, at 0–8° C., the diazo solution is combined in the presence of sodium acetate with an aqueous solution of 23.7 parts of sodium 1-hydroxy-naphthalene-5-sulfonate (of 41.5 per cent. strength). As soon as the coupling is complete, the dyestuff is completely precipitated by addition of concentrated sodium chloride solution, filtered with suction, washed with a solution of sodium chloride and dried.

A dyestuff of similar good properties is obtained by using, instead of 1-amino-2-methoxybenzene-5-(betachlorethylsulfone), 1-amino-2-methoxybenzene-5-(alphabeta-dibromethylsulfone) the acetyl compound of which melts at 157–158° C.

(2) Wool is dyed from a neutral bath with 1.5 per cent. of the dyestuff of the formula:

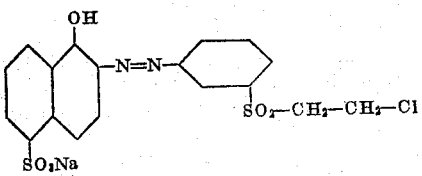

A vivid scarlet dyeing of good fastness to washing, fulling in an acid solution, perspiration and sea-water and very good fastness to decatizing is obtained.

The dyestuff may be prepared as follows:

6.6 parts of 1-aminobenzene-3-(beta-chlorethylsulfone) melting at 90–91° C. are diazotized in the usual manner and, at 0–8° C., the diazo solution is mixed with an aqueous solution of 16.6 parts of sodium 1-hydroxy-naphthalene-5-sulfonate (of 44.6% strength), in the presence of sodium acetate. As soon as the coupling is complete, the dyestuff is filtered with suction, washed with dilute sodium chloride solution and dried.

By using as coupling component 2-hydroxy-naphthalene-6-sulfonic acid instead of 1-hydroxy-naphthalene-5-sulfonic acid, a dyestuff is obtained which exhibits on wool an orange dyeing of good to very good fastness to washing, fulling in an alkaline solution and decatizing.

(3) Wool is dyed in the usual manner with 0.76% of the dyestuff of the formula:

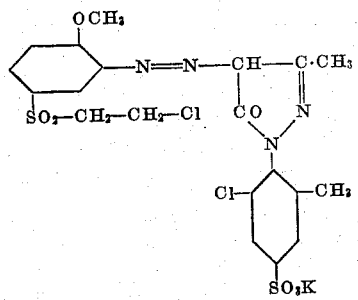

A vivid yellow tint of very good fastness to washing, perspiration and sea-water and good to very good fastness to fulling in an alkaline and in an acid solution, decatizing and carbonizing is obtained.

The dyestuff may be prepared as follows:

10 parts of 1-amino-2-methoxybenzene-5-(beta-chlorethyl-sulfone) are diazotized in the usual manner and the diazo solution is mixed at 0–10° C. with an aqueous solution of 12.7 parts of 1-(6'-chloro-2'-methyl-4'-sulfophenyl)-3-methyl-5-pyrazolone, in the presence of potassium acetate. As soon as the coupling is complete, the dyestuff is precipitated completely by means of concentrated potassium chloride solution, filtered with suction, and washed with dilute potassium chloride solution and dried.

(4) 30 parts of the sodium salt of the dyestuff having the formula:

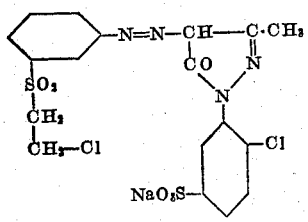

are dissolved with 10 parts of thio-diethylene glycol and 250 parts by volume of hot water, stirred with 400 parts of neutral tragacanth thickening and the whole is made up to 1000 parts of printing paste. After printing on cellulose acetate rayon and drying, the material is steamed for 1 hour in a boiler and then thoroughly rinsed in the cold. A vivid yellow tint of good fastness to wet-processing is obtained.

(5) A 4 per cent dyeing of the dyestuff:

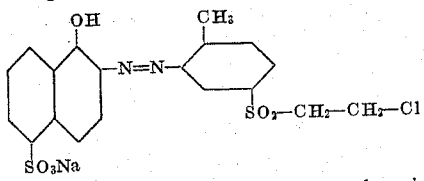

is produced in the usual manner on superpolyamide fiber. A scarlet dyeing of good to very good fastness properties is obtained.

1-amino-2-methylbenzene-5-(beta-chlorethylsulfone), used as diazo component, melts at 104–105° C.

(6) A 2 per cent. dyeing on wool produced in the usual manner with the dyestuff of the formula:

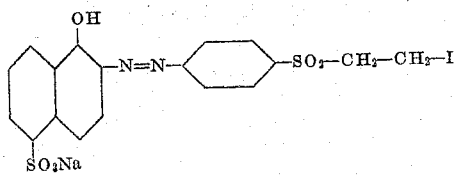

is rinsed and then after-treated for a short time in a bath containing 1% of sodium carbonate and 1% of soap per liter. The material is then rinsed well and dried. A red dyeing of good fastness to wet-processing is obtained.

The dyestuff may be prepared as follows:

9.3 parts of 1-aminobenzene-4-(beta-iodo-ethylsulfone), melting at 169° C., are diazotized in the usual manner and the diazo solution is mixed at 0–8° C. with an aqueous solution of 17.8 parts of sodium 1-naphthol-5-sulfonate (of 41.5 per cent. strength), in the presence of sodium acetate. As soon as the coupling is complete, the dyestuff is filtered with suction, washed with dilute sodium chloride solution and dried.

(7) 30 parts of the potassium salt of the dyestuff:

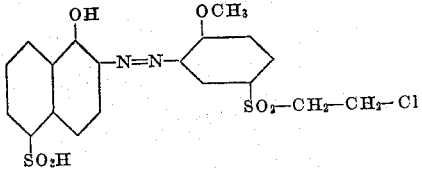

are dissolved with 15 parts of thio-diethylene glycol and 250 parts by volume of hot water, stirred with 400 parts of neutral tragacanth thickening and made up to 1000 parts of printing paste. After printing on cotton fabric and drying, the material is steamed for 1 hour and then developed at 50° C. in a bath containing per liter 20 parts of barium chloride, 200 parts of sodium chloride and 5 parts by volume of concentrated caustic soda solution. A vivid red print of good fastness to wet-processing is obtained.

We claim:

The acid mono-azo-dyestuff corresponding in the free form to the following formula:

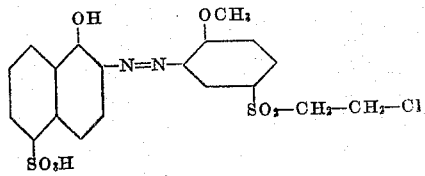

References Cited in the file of this patent

UNITED STATES PATENTS

| | | |
|---|---|---|
| 2,151,857 | Manz et al. | Mar. 28, 1939 |
| 2,248,911 | Behnisch et al. | July 8, 1941 |
| 2,424,493 | Muller et al. | July 22, 1947 |
| 2,432,403 | Felix et al. | Dec. 9, 1947 |

FOREIGN PATENTS

| | | |
|---|---|---|
| 456,343 | Great Britain | Nov. 3, 1936 |
| 492,749 | Great Britain | Sept. 23, 1938 |